United States Patent
Rieger et al.

(10) Patent No.: US 6,922,623 B2
(45) Date of Patent: Jul. 26, 2005

(54) METHOD FOR CONTROLLING AN AUTOMATED CLUTCH

(75) Inventors: Christian Rieger, Bischweier (DE); Jürgen Eich, Buhl (DE); Robert Fischer, Buhl (DE); Jürgen Gerhart, Appenweier (DE); Mario Jung, Sinzheim (DE); Holger Stork, Buhl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/678,736

(22) Filed: Oct. 2, 2003

(65) Prior Publication Data

US 2004/0128050 A1 Jul. 1, 2004

Related U.S. Application Data

(63) Continuation of application No. PCT/DE02/01149, filed on Mar. 28, 2002.

(30) Foreign Application Priority Data

Apr. 2, 2001 (DE) .......................................... 101 16 321

(51) Int. Cl.⁷ .......................... B60K 41/00; F16D 48/00
(52) U.S. Cl. ........................................ 701/67; 477/174
(58) Field of Search .................... 701/67, 68; 477/166, 477/174, 70, 76, 78, 86

(56) References Cited

U.S. PATENT DOCUMENTS

| 4,651,142 A | | 3/1987 | Klatt | |
|---|---|---|---|---|
| 5,056,639 A | * | 10/1991 | Petzold et al. | 477/176 |
| 5,980,428 A | * | 11/1999 | Liu | 477/180 |
| 6,113,515 A | * | 9/2000 | Salecker et al. | 477/72 |
| 6,171,212 B1 | * | 1/2001 | Reuschel | 477/86 |
| 6,631,319 B1 | * | 10/2003 | Luh | 701/54 |
| 2002/0042327 A1 | * | 4/2002 | Reuschel et al. | 477/175 |

FOREIGN PATENT DOCUMENTS

| DE | 198 12 629 A1 | 9/1999 |
|---|---|---|
| DE | 199 15 207 A1 | 10/2000 |
| FR | 2 767 884 A1 | 3/1999 |

* cited by examiner

Primary Examiner—Michael J. Zanelli
(74) Attorney, Agent, or Firm—Darby & Darby

(57) ABSTRACT

An automated clutch of a motor vehicle is controlled according to a method with the steps:

a) determining a first engine rpm-gradient signal ($dn_m(M)/dt$) based on an engine torque signal ($M_e$) and a target value ($M_k$) of the clutch torque;

b) determining an engine rpm-rate signal ($n_m(R)$) based on the engine rpm-gradient signal from step a);

c) comparing an actual engine rpm-rate ($n_m$) to the engine rpm-rate signal ($n_m(R)$) from step b) and determining a correction quantity K based on the comparison; and d) correcting the first engine rpm-gradient signal ($dn_m(M)/dt$) with the correction quantity K.

20 Claims, 5 Drawing Sheets

METHOD FOR CONTROLLING AN AUTOMATED CLUTCH

CROSS-REFERENCE TO RELATED APPLICATION

This application is a continuation of International Patent Application Serial No. PCT/DE02/01149, filed Mar. 28, 2002, published in German, which is hereby incorporated by reference in its entirety.

BACKGROUND OF THE INVENTION

The invention relates to a method and apparatus for operating a motor vehicle. The invention further relates to a means for carrying out the method, and to the use of the method and apparatus in a motor vehicle.

In particular, the invention relates to devices and methods as well as the utilization of said devices and methods for the automated actuation of a unit that forms part of the power train of a motor vehicle, in particular a clutch, a transmission, and/or an engine.

The state of the art offers opportunities for improvement of the aforementioned devices in particular with regard to their durability, wear resistance, functionality, layout, number of parts, user convenience, ease of assembly, cost and safety.

OBJECTS OF THE INVENTION

As a general objective, the invention aims to improve a state-of-the-art device with regard to one or more of the aforementioned characteristics, i.e., durability, wear resistance, functionality, layout, number of parts, user convenience, ease of assembly, cost and safety.

A specific objective of the invention is to develop a start-up function to be used by a control unit for the actuation of the vehicle clutch, so that the start-up, i.e., the transition from a stationary to a moving state of the vehicle, is controlled by engaging the clutch in accordance with a control target. In this start-up process, a clutch that is actuated automatically by an actuator unit is controlled through control command signals in such a manner that the vehicle is set in motion as the clutch is engaged in accordance with a target function.

A further objective of the invention is to propose a way of determining and using characteristic quantities such as a friction value in the control of an automated clutch to achieve an engagement and/or disengagement of the clutch without unnecessarily long slippage phases. In vehicles with an automated clutch, the value that quantifies the clutch friction (also referred to as friction value) used in the control process can be stored at the times when the control device of the automated clutch is being shut down, i.e., when turning off the ignition key of the vehicle. At a subsequent start-up of the control device, the stored friction value is used in the initialization of the friction value adaptation.

The invention further has the objective of proposing a way of controlling a clutch so that deviations caused by temperature changes will not cause the clutch to behave in an uncomfortable or unsafe manner.

SUMMARY OF THE INVENTION

The invention provides a solution for at least one of the foregoing objectives in a vehicle of the kind described above by making use of an observer system or an observer strategy for determining the time derivative of the engine rpm-rate and for determining the friction value of the clutch.

The term "observer" in the sense of a technical system is known in the field of control theory. It means an instrument by which process signals not captured through measurements can be reconstructed from observations of a few of the system's outputs. The best-known embodiment of an observer is the Luenberger observer, a linear model that parallels the actual system and is suitable for estimating internal variables of a process. As an example, the invention proposes the concept of determining a velocity in a process or system where only the associated travel position signal is measured by a sensor.

For example, state-of-the-art engine control systems of motor vehicles deliver information about the engine rpm-rate by way of a central area network (CAN) but fail to include the time derivative of the engine rpm-rate (also referred to herein as engine rpm-gradient), although the latter is useful or necessary for a diversity of control and regulating functions in the power train.

As an approximation of the engine rpm-gradient, one can use the difference quotient $$\frac{dn_m}{dt} \approx \frac{n_m(t_k) - n_m(t_{k-1})}{T_A}, \text{ wherein}$$

$dn_m/dt$ represents the time derivative of the engine rpm-rate
$n_m$ $n_m(t_k)$ represents the engine rpm-rate at a measuring point k $n_m(t_{k-1})$ represents the engine rpm-rate at a measuring point k−1 $T_A = t_k - t_{k-1}$ represents the time interval from point k−1 to point k.

However, the foregoing solution has the disadvantages of signal noise and a possible loss of phase information. If a filter is used for smoothing the signal, this can also lead to a loss of phase information.

The use of an observer as defined above proves especially advantageous in systems with an automated clutch and/or an automated transmission, as it provides a means of also including the currently set clutch torque (besides the engine rpm-rate and the engine torque) in the calculation of the engine rpm-gradient.

The principal structure of the observer is illustrated in FIG. 3a. The advantage of using an observer according to the illustrated structure is due to the fact that the determination of the rpm-gradient is not based on the rpm-rate alone, but also includes the torque values which are the cause of an rpm-gradient. Block 209, represented with broken lines in FIG. 3a can be added as a means of accounting for time lags that may occur in the engine control system between the measurement and the signal transmission of the engine rpm-rate. The sensitivity of the observer is set by means of an amplification factor $\hat{K}$. It is also possible to expand the observer structure in the sense of a model-based system representation as a means of representing characteristic quantities such as the friction value of the clutch during slip phases.

The physical friction value, and thus also the value used by the control method, is subject to a relatively strong increase associated with a heating-up of the clutch. If the vehicle is switched off while the clutch is hot and the physical friction value used by the control method is therefore very high, the friction value used by the control method in a subsequent restart of the vehicle with a cold clutch, e.g., two to three hours later, will have the same elevated value as it had when the vehicle was last switched off. However, because of the cooling-down of the clutch, the physical friction value of the clutch will have returned to its normal level. Thus, the vehicle starts running with an incorrect friction value being used by the control method. As a result, the gear shifts are performed with too much slip in the clutch, so that the slip phases during engagement and disengagement of the clutch will be too long. This condition continues until an adaptation routine used in the control method will have correctly updated the friction value.

It is advantageous to use a different way of initializing the friction value that is to be used by the control system at the start of the engine. The initialization can be performed in the following ways:

1. The friction value to be used by the control system can be initialized with a fixed preset value (RW-Init).
2. The friction value to be used by the control system can be initialized with a value that depends on how long ago the engine was last turned off. The friction value that was in effect at the time the engine was turned off converges towards a nominal preset value (RW-Init) to an extent that depends on the elapsed time since the engine was turned off.
3. The friction value to be used by the control system can be initialized with a value that is a function of the temperature. Based on a temperature model that also allows a clutch temperature to be determined, it is possible to determine the temperature decrease that occurred between the time the engine was switched off and the time the control system is switched on again. The initializing value for the friction value could be determined through this temperature model. Analogously, one could use the radiator temperature, the engine temperature, or a similar characteristic variable that may be available to the control device.
4. The friction value to be used by the control system can be initialized with a value that is based on a characteristic data array. This array, curve, or curve field can be a function of the time elapsed since the engine was last turned off, or a function of the temperature decrease of the engine or of the clutch.
5. The friction value to be used by the control system can be initialized with a nominal initialization value (RW_Init) which, according to the invention, can be determined in at least one of the following ways:
   a) The initialization value is set as a fixed value, e.g., as a substitute friction value, or by using a nominal initialization value.
   b) The nominal initialization value can be adapted, e.g., by redetermining the nominal initialization value at set time intervals.
   c) The nominal initialization value can be adapted at certain temperatures, for example only in the range between 80° C. and 100° C., so that the friction value matches the situation at the start of the engine.
   d) In addition, if an adaptation of the nominal initialization value is made, it can be limited to a small change in order to avoid the risk of erroneously making a big change.

It can also be advantageous to use combinations of the foregoing concepts.

It is advantageous to perform an initialization of the friction value at the time the ignition is switched on, especially in a case where it can be expected that the current friction value has changed substantially from the friction value that was determined and adapted in the operating phase that ended when the ignition was last switched off. Thus, it is recommended to perform an initialization of the friction value when certain conditions indicate that the friction value may have changed. As a means of detecting at least one such condition, the current clutch temperature at the end of an operating phase is stored in a memory such as an EEPROM. When the ignition is subsequently switched on again, the stored temperature is retrieved from the memory device and compared to the current clutch temperature. If a large difference is found between the two temperatures, the friction value should be reinitialized.

The current clutch temperature can be calculated, e.g., by means of a temperature model, or it can be measured with a temperature sensor. At least one of the following signals may be used to determine the clutch temperature: transmission temperature, engine temperature, outside temperature, elapsed time since the engine was last turned off, and engine coolant temperature. For cost reasons, it may for example be advantageous to have no clutch temperature sensor, but to calculate the clutch temperature based on at least one of the existing temperature sensors of the motor vehicle and using an appropriate temperature model.

It has been found that the friction value used in the control program for calculating the transmittable torque clutch has an influence on the clutch temperature and vice versa. If the friction value is not adapted over an extended time interval, there may nevertheless be a change in the clutch temperature. This is possible, e.g., in the following situations:
   if the vehicle engine is turned off;
   in a hybrid-drive vehicle, if the electric motor alone is used as a drive source over an extended time period;
   if gear shifts are performed with the clutch engaged, so that there is no opportunity for adaptation during gear shifts, for example in a hybrid-drive vehicle or in a vehicle with a power-shift transmission, i.e., a transmission that is capable of transmitting torque during gear changes.

If the control program uses an incorrect friction value in the start-up of the vehicle or in the clutch re-engagement after a gear change, this may result in oscillations of the power train and in a diminished level of driving comfort.

It is advantageous to establish a functional dependence between the temperature and the friction value:

$$Rw=\text{function1}(RwTU, TcC), \quad (1)$$

wherein Rw represents the temperature-dependent friction value that is used for the control of the clutch in all calculations, for example to determine values of the clutch torque. RwTU is the temperature-independent portion of the friction value, and TcC represents the current clutch temperature. The inverse of the foregoing function, i.e., $$RwTU=\text{function2}(Rw, TcC), \quad (2)$$

should also be established, so that the temperature-independent portion of the friction value can be determined from the current friction value Rw.

The functions 1 and 2 may be arithmetically defined or represented by value tables. In a practical implementation, the functional correlation between Rw and RwTU could be represented through a temperature-dependent correction factor:

$$Rw=RwTU \times F(TcC) \quad (3),$$

$$\text{and } RwTU=Rw/F(TcC) \quad (4).$$

The values Rw and RwTU are stored in memory, e.g., in an EEPROM, at the time of turning off the ignition. The value RwTU depends, e.g., on the type of friction liner that is used in the clutch, on the state of wear, and also on the degree of humidity of the friction liner, making it necessary to provide a possibility of also adapting the value of RwTU. The value of Rw is advantageously adapted during the start-up of the vehicle or during the re-engagement of the clutch after a gear change.

As a concept of the invention, it is proposed to initialize the temperature-dependent friction value Rw after a system start and at each start-up of the vehicle as well as prior to re-engaging the clutch, for example in accordance with equation (1) or equation (3). As this could result in an abrupt change of the friction value Rw, which could cause a sudden change of the clutch torque, it is practical to perform this initialization only in situations where a sudden change of the clutch torque has no critical consequences. It is therefore preferable to perform the initialization or provisional adaptation of the friction value for example at a time when the clutch is completely engaged, for example at a system start or with each volume adjustment of a hydraulic circuit such as a fluid replenishment through a snifting conduit, and/or when the clutch is completely out of engagement, and/or when the clutch is transmitting a minimal amount of torque.

After a complete adaptation, the temperature-independent portion of the friction value can be updated in accordance with equation (2) or equation (4). Preferably, this inverse adaptation of the temperature-independent value is not performed directly but by way of a filter, in order to avoid strong fluctuations of the temperature-independent value RwTU. It is further possible to use a two-stage filter with different time constants. The result of the short-term filtering operation, RwTU1, would represent short-term changes of the friction value caused, e.g., by high levels of humidity. The value RwTU1 is in effect only for one trip of the vehicle and is reset to the long-term value at each system start. The long-term value RwTU2 represents the result of the long-term filtering process and contains that part of the temperature-independent value which changes only as a result of aging. An adaptation of the temperature-independent friction value can be suppressed for example at extremely low or extremely high values of the clutch temperature for which the temperature dependence of the friction value may not be reliably known. To ensure a correct initialization at the system start, a reliable estimated value for the clutch temperature must be available at that point in time.

Vehicles with an automated transmission and/or an automated clutch employ a so-called friction value adaptation, wherein the friction value is determined mathematically from operating variables and continuously adapted in the control program, i.e., updated on the basis of current data so that it reflects the currently effective physical friction value of the clutch. To perform this adaptation, the currently transmitted friction torque M(K) can be determined from the engine torque M(M) and the inertial torque M(B) which consists of the multiplication product of the rotary engine acceleration and the effective mass moment of inertia of the crankshaft and flywheel:

$$M(K)=M(M)-M(B)$$

If the adaptation delivers a friction value that is too low, for example due to erroneous torque signals or other inaccuracies, the build-up of clutch torque after each gear shift will be too strong. As a result, the clutch will pass through the slipping phase very quickly, so that the gear shift may in some cases be accompanied by a jolt. In every slipping phase after a gear shift, the friction value is always re-adapted to the new conditions. If the error or inaccuracy in the torque signals disappears, the calculated clutch torque will return to a better agreement with the physical values, and the calculated friction value is brought back into agreement with the physical friction value by means of the adaptation procedure. After an error has been introduced into the adapted friction values, the subsequent adaptation cycles will be subject to an undesirable hysteresis.

In order to avoid errors of this kind in the adaptation, the invention introduces a measure based on the experience that with a correctly adapted friction value, the duration of the clutch slippage is nearly constant for each engagement process. It is therefore proposed to detect and evaluate the duration of the clutch slippage at the engagement of the clutch. If a deviation of the slippage time interval from a reference value is detected, this serves as an indication of errors in the torque signals and as a result, the program will change to an emergency adaptation mode for the friction value. The emergency adaptation can be made with signals other than the erroneous torque signals. If the friction value is correct, the slippage time interval after a gear shift as a function of gas pedal depression will be constant. Although the slippage time interval depends on additional factors such as the grade angle of the road and/or the presence and weight of a trailer, it is possible to eliminate the influence of these factors through appropriate adjustments. It is advantageous to determine the friction value through an emergency adaptation, if the slippage time duration exceeds a certain time limit that depends on the amount of gas pedal depression. The correlation between slippage time and emergency adaptation of the friction value can be based on a mathematical function. A linear correlation may be particularly advantageous where a larger friction value is to be determined in case of a longer slippage time interval. Thus, this kind of adaptation is not based on the engine torque and the rotary acceleration of the engine, but on the slippage time duration and on the pedal depression:

Friction value=f(slippage duration, pedal depression, . . . )

According to a further concept of the invention, the adaptation of a friction value is determined on the basis of the clutch temperature. For example, if a clutch is heated up rapidly within a short time, the friction value of the clutch changes. To provide a compensation for this phenomenon, it is advantageous to perform a friction value adaptation in a software program for the clutch control. To ensure the stability of the adaptation routine in the control program and to limit the influence of transient extremes of the clutch temperature as measured, e.g., directly by means of a clutch temperature sensor or determined indirectly from other parameters such as the signals of other temperature sensors, the transmitted clutch torque, or the engine torque, it is practical to set a limit for the change of the friction value, meaning that the friction value can change by no more than a given amount per unit of time. If the adaptation program routine results in a larger change, the value delivered by the program is limited to the given maximum.

However, if the clutch temperature rises very rapidly, the adaptation of the friction value may be too slow. Nevertheless, it is not recommended to raise the general limit for the rate of change of the friction value because of the risk that this could make the adaptation process unstable.

If the adaptation of the friction value is too slow, the build-up of clutch torque will not be strong enough after gear shifts or when starting up from a stand-still, i.e., the clutch will have too much slippage.

According to a concept of the invention, the limit for the maximum rate of change of the friction value is made dependent on the clutch temperature.

If the clutch temperature rises rapidly, this can be taken into account in the adaptation of the friction value by raising the limit for the maximum rate of change of the friction value, for example by a predetermined fixed amount. The limit for the maximum rate of change of the friction value can also be raised by an amount that depends on the magnitude of the rate of temperature increase. The correlation between the clutch temperature of its rate of increase and the limit for the maximum rate of change of the friction value can be based on a mathematical formula. It is particularly practical to use a linear correlation, i.e., the higher the clutch temperature the higher the limit that is set for the maximum rate of change of the friction value.

According to a further concept of the invention, the adaptation of the friction value at the start-up of the vehicle can be influenced in a positive sense. If the vehicle is switched off at a time when the clutch is hot and the adapted friction value is therefore low, and the ignition is turned on again after the clutch has cooled down, the friction value used in the control program will be in error, i.e., too low. As a remedy for this, it can be advantageous to not correlate the friction value directly to the clutch temperature or its rate of change, but to introduce a factor and/or offset quantity into the correlation which is varied dependent on the temperature. For example, the factor can be set to 1 and the offset to 0 when the ignition is switched on again. In addition to using a factor or additive offset, it is also possible to store the information that the clutch was hot when the ignition was switched off. In this case, the limit for the maximum rate of change of the friction value can likewise be increased at the time the ignition is switched on again. This has the result that the friction value which starts out too small is adapted more rapidly to the physical friction value.

According to a further concept of the invention, the excessive amount of slippage can be eliminated if an integrating component in the control program is activated also in start-up phases.

To prevent a negative effect on the start-up behavior which can occur with the last-mentioned concept, it is practical if the integrating component is activated only when the clutch temperature is above the given threshold value.

BRIEF DESCRIPTION OF THE DRAWINGS

In the following, the invention will be described in more detail based on embodiments illustrated in the drawings, wherein.

DETAILED DESCRIPTION OF PREFERRED EMBODIMENTS

Figure 1:
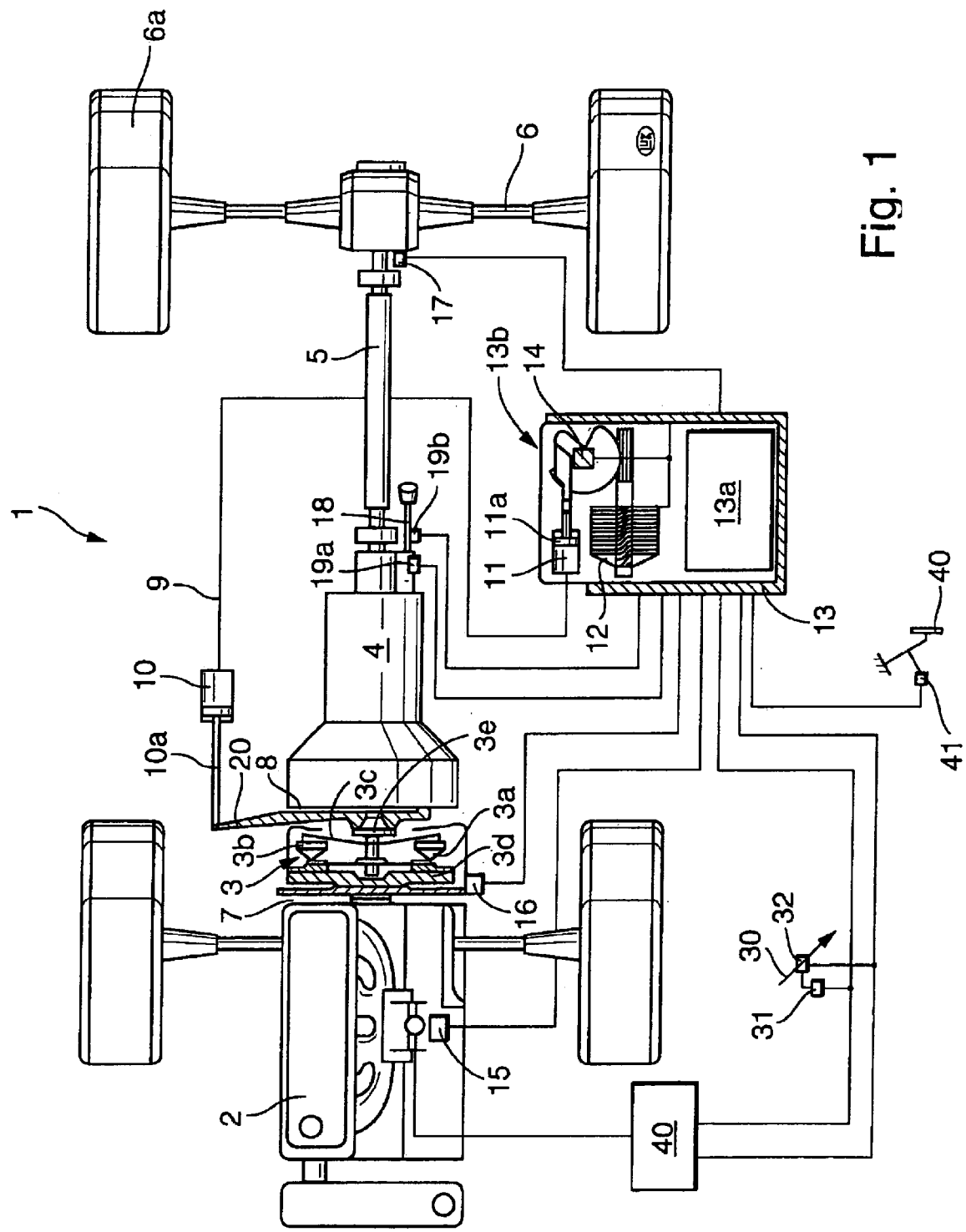
FIG. 1 represents a first example of a vehicle that can incorporate the invention.

FIG. 1 represents a schematic view of a vehicle 1 with a drive source 2 such as a motor or combustion engine. Also shown in the power train of the vehicle is a torque-transmitting system 3 and a transmission 4. The torque-transmitting system 3 in this example is arranged at a place in the torque-flow path between the engine and the transmission. The drive torque generated by the engine is transmitted by way of the torque-transmitting system to the transmission and from the transmission 4 downstream through a drive shaft 5 and a driving axle 6 to the wheels 6a.

The torque-transmitting system 3 is configured as a clutch, such as a friction clutch, a laminar disc clutch, magnet-powder clutch or converter-bypass clutch. The clutch can be self-adjusting as well as wear-compensating. The arrangement 4 with the transmission includes for example a manual shift transmission that can be shifted between different gear stages. However, in keeping with the general concept of the invention, the transmission can also be an automated shift transmission in which the shifting is performed by means of at least one actuator. The term "automated shift transmission" further encompasses an automated transmission that is shifted with an interruption in the tractive force and in which the shifting process is performed by means of at least one actuator.

Furthermore, an automatic transmission may also be used, where the term "automatic transmission" means a transmission that shifts substantially without an interruption in the tractive force and which, as a rule, is based on planetary gear stages.

As a further possibility, a continuously variable transmission, such as a cone-pulley transmission, may be used. The automatic transmission could also be equipped with a torque-transmitting system 3, such as a clutch or a friction clutch, arranged on the downstream side of the power train. The torque-transmitting system can further be configured as a start-up clutch and/or reverse drive clutch and/or safety clutch in which the amount of torque transmitted can be controlled to meet a targeted value. The torque-transmitting device can be a dry friction clutch, or a wet friction clutch operating, e.g., in a fluid, or it can also be a torque converter.

The torque-transmitting system 3 has an upstream side 7 and a downstream side 8 in relation to the flow of torque in the power train. Torque is transmitted from the upstream side 7 to the downstream side 8 when a compressive contact force is applied to the clutch disc 3a by means of the pressure plate 3b, the diaphragm spring 3c, the release bearing 3e as well as the flywheel 3d. The compressive force is applied and removed through the release lever 20 by means of an actuator device.

The torque-transmitting system 3 is controlled by means of a control system or controller device 13 which may include the electronic control module 13a and the actuator 13b. In another advantageous design, the actuator and the electronic control module may be accommodated in two different assembly units or housings.

The controller device 13 can include the control and power electronics for the electric motor 12 of the actuator 13b. This configuration allows an advantageous spatial arrangement where space is needed only for the actuator and associated electronics. The actuator has a drive motor 12 such as an electric motor which acts on a master-cylinder 11 through a gear mechanism, e.g., a worm gear, spur gear, crank mechanism or a screw spindle drive. The motor can interact with the master cylinder either directly or through connecting rods.

The movement of the output element of the actuator, such as the master cylinder piston 11a, is detected by a clutch displacement sensor 14 which registers the position, speed, or acceleration of a quantity that is in a proportional relationship to the position or degree of engagement, or the speed or acceleration of the clutch. The master cylinder 11 is connected to the slave cylinder 10 by way of a pressure medium conduit 9 such as a hydraulic line. The output element 10a of the slave cylinder is operatively connected with the release lever or releasing means 20, so that a movement of the output element 10a of the slave cylinder will, in turn, cause the releasing means 20 to move or tilt in order to control the amount of torque that is transmitted through the clutch 3.

The actuator 13b for controlling the amount of torque transmitted through the torque-transmitting system 3 can be designed to work through the action of a pressure medium, i.e., it can be equipped with master and slave cylinders for the pressure medium. The choice of pressure media includes, e.g., hydraulic and pneumatic media. The master cylinder may be actuated by means of an electric motor 12, e.g., under electronic control. The actuator 13b may also be driven by a power source other than an electric motor, e.g., by a hydraulic drive source. It is further conceivable to use magnetic actuators to control a position of an element.

In a friction clutch, the control of the amount of torque that can be transmitted is performed by applying a controlled amount of pressure on the friction linings of the clutch disc between the flywheel 3d and the pressure plate 3b. The amount of force on the pressure plate, and thus the pressure on the friction linings, is controlled through the position of the releasing means 20, e.g., a release fork or a concentric slave cylinder, whereby the pressure plate can be moved to and maintained at any position between two end positions. One end position corresponds to a completely engaged clutch position, while the other end position corresponds to a completely disengaged clutch position. To set the clutch so that it will transmit a torque of, e.g., lesser magnitude than a currently delivered engine torque, the pressure plate 3b can for example be set to a position corresponding to an intermediate range between the two end positions. With the controlled actuation of the releasing means 20, the clutch can be fixed at this position. However, the clutch can also be enabled to transmit amounts of torque exceeding the actually delivered engine torque by a defined margin. This allows the currently available amounts of engine torque to be transmitted, while torque fluctuations in the power train, e.g., in the form of transient peak amounts of torque, are damped and/or isolated.

To run the torque-transmitting system, in the sense of controlling or regulating the amount of torque, the relevant operating quantities of the entire system are at least during part of the time monitored by sensors that deliver the current status data, signals and measurement values required for the control. This information is processed by the control unit, and there can also be a signal connection to other electronic units, e.g., electronic modules associated with the engine or an anti-lock braking system (ABS) or an anti-slip regulation system (ASR). The sensors perform the functions of, e.g., detecting rpm-rates such as wheel rpm-rates and engine rpm-rates, the position of the gas pedal, the throttle valve position, the gear position of the transmission, an intent of the driver to shift gears, and other vehicle-specific characteristic quantities.

FIG. 1 illustrates a vehicle in which a throttle-valve sensor 15, an engine-rpm sensor 16 as well as a speed sensor 17 are used and are transmitting measurement values and other information to the control unit. The electronic module, e.g., a computer module, of the control unit 13a serves to process the system input quantities and to transmit control signals to the actuator 13b.

The transmission is configured, e.g., as a gear-shifting transmission in which the ratio levels are changed by means of a shift lever, or the transmission is actuated or operated by means of the shift lever. Furthermore, a sensor 19b is arranged at the operating lever or shift lever 18 of the manually shiftable transmission. The sensor 19b serves to detect an intent of the driver to shift gears and/or to detect the current gear position and to transmit this information to the control unit. The sensor 19a is connected to the transmission and likewise performs the functions of detecting a current gear position and/or an intent of the driver to shift gears. The detection of an intent to shift gears by means of at least one of the sensors 19a, 19b can be achieved by designing the sensor as a force sensor to detect when a force is applied to the shift lever. The sensor could also be configured as a displacement sensor or position sensor, where the control unit would be programmed to determine the presence of an intent to shift if a change has been found in the position signal.

The control unit is in signal communication with all of the sensors at least at certain times and evaluates the sensor signals and system input quantities in such a manner that the control unit sends control or regulation commands to the at least one actuator dependent on the current operating point of the system. The drive source 12 of the actuator, such as an electric motor, receives from the clutch-actuator control unit a control target signal that depends on measurement values and/or system input quantities and/or signals of the associated sensors. The control unit contains a control program implemented in hardware or software to evaluate the incoming signals and to calculate or determine the output quantities based on comparisons and/or functions and/or fields of characteristic curves.

It is advantageous if modules are implemented in the control unit 13 to acquire data on torque, gear position, slippage and or operational status, respectively, or if the control unit 13 is in signal communication with at least one of the aforementioned modules. The modules can be implemented as control programs in hardware and/or software to determine on the basis of the incoming sensor signals how much torque is produced by the drive source 2 of the vehicle 1, what gear position the transmission is in, how much slippage is occurring in the torque-transmitting system, and what is the current operating state of the vehicle. From the signals of sensors 19a and 19b, the gear-position detector unit determines which gear is currently active in the transmission. The sensors 19a and 19b are operatively connected to the shift lever and/or the internal gear-shifting means inside the transmission, such as for example a central shifting shaft or shifting rod, where the sensors serve to detect for example the position and/or movement of these transmission elements. Further, a load-lever sensor 31 such as a gas pedal position sensor can be attached to the load lever 30 (such as a gas pedal) to detect the load-lever position. A further sensor 32 can function as an on/off switch that is on or off depending on whether the gas pedal is active or inactive, so that the binary on/off signal indicates whether the engine-load control lever, such as a gas pedal or accelerator pedal, is currently being actuated. The load-lever sensor 31, on the other hand, provides a quantitative determination of the degree of load-lever actuation or gas pedal actuation.

In addition to the accelerator or gas pedal 30 (or engine-load control lever) with the associated sensors, FIG. 1 shows a brake-actuating element 40 for the main brake or the parking brake, such as a brake pedal, hand-brake lever, or a hand- or foot-operated parking brake actuator. At least one sensor 41 is arranged at the actuator element 40 to monitor its operating state. The sensor 41 may for example be a binary detector such as a switch that indicates whether or not the actuator element is on or off. A signal device such as a brake light can be connected to the sensor to provide an indication that the brake is being applied. This arrangement could be used for the main brake as well as for the parking brake. However, the sensor can also be configured as an analog sensor such as a potentiometer, to indicate the degree of application of the actuator element. The analog sensor, likewise, can be connected to a signal device.

Figure 2:
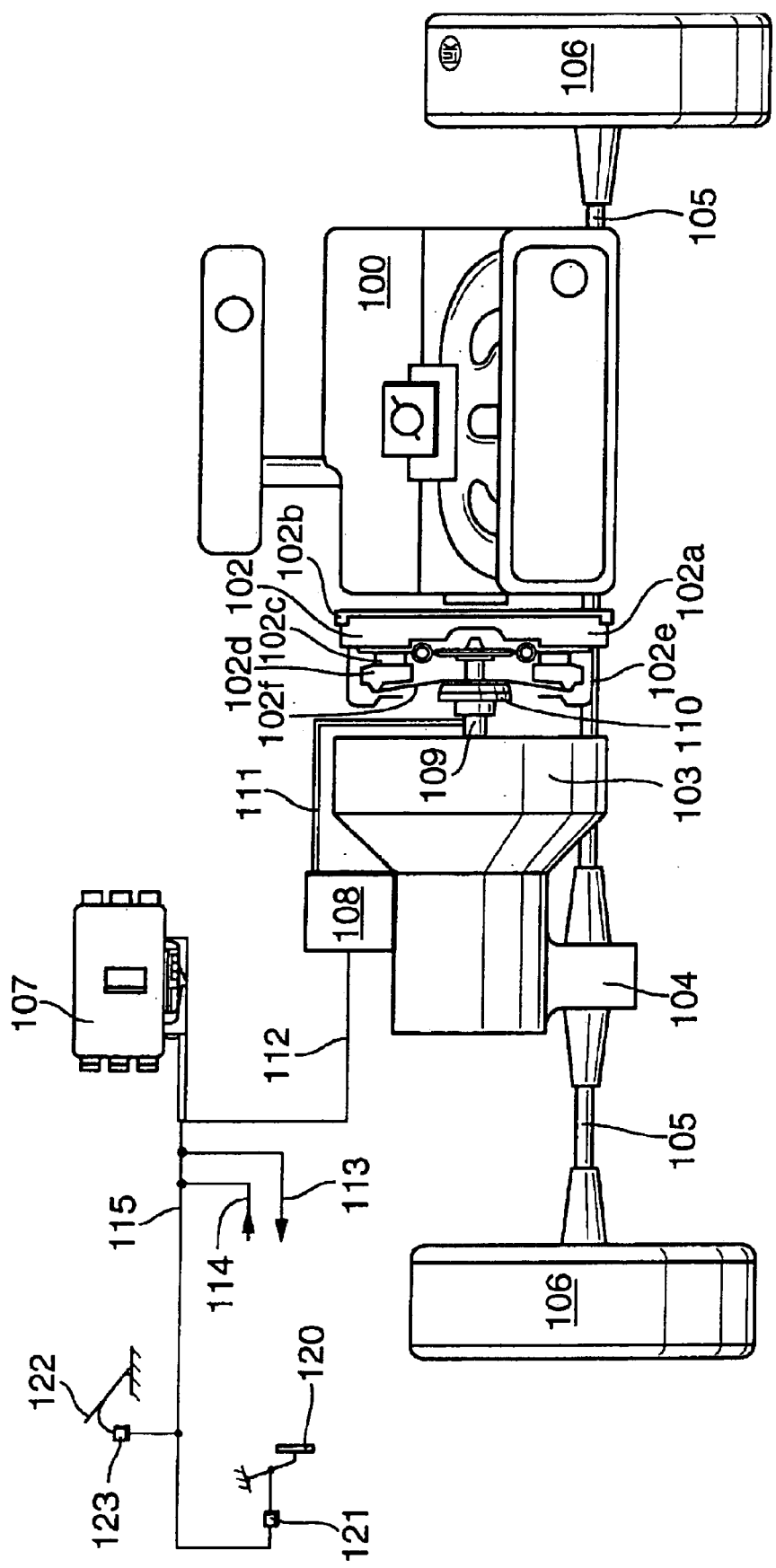
FIG. 2 represents a second example of a vehicle that can incorporate the invention.

FIG. 2 gives a schematic illustration of a power train of a vehicle with a drive source 100, a torque-transmitting system 102, a transmission 103, a differential 104 as well as drive axles 109 and wheels 106. The torque-transmitting system 102 is arranged on or attached to a flywheel 102a which, as a rule, is equipped with a starter gear rim 102b. The torque-transmitting system has a pressure plate 102d, a clutch cover 102e, a diaphragm spring 102f, and a clutch disc 102c with friction linings. A clutch disc 102c, in some cases with a damper device, is interposed between the pressure plate 102d and the flywheel 102a. An energy-storing device such as a diaphragm spring 102f pushes the pressure plate axially against the clutch disc. A clutch actuator element 109 such as, e.g., a pressure-medium operated concentric release device, serves to actuate the torque-transmitting system. A release bearing 110 is arranged between the concentric release device and the tongues of the diaphragm spring 102f. When the release bearing moves in the axial direction, is pushes against the diaphragm spring and thereby disengages the clutch. The clutch can be configured either as a push-actuated or pull-actuated clutch.

The actuator 108 is an actuator of an automated gear-shifting transmission and also contains an actuator unit for the torque-transmitting system. The actuator 108 serves to actuate shifter elements internal to the transmission such as, e.g., a shifter cylinder or shifter rods or a central shifter shaft of the transmission. The actuator may allow the gears to be engaged and disengaged in sequential order of gear ratio, or also in an arbitrary order. The clutch actuator element 109 is actuated by way of the connection 111. The control unit 107 is connected to the actuator by way of the signal connection 112. The signal connections 113 to 115 summarily represent connections leading to the control unit 107, where the line 114 conducts incoming signals, the line 113 conducts outgoing control signals, and the line 115 represents, e.g., a data bus connection to other electronic units.

To set the vehicle in motion from a stand-still condition or a slow rolling condition or crawl state, i.e., to initiate an acceleration of the vehicle under the control of the driver, the latter in essence only depresses the gas pedal, such as the load control lever 30, as the automated clutch control or regulation takes charge over setting the amount of torque that is transmitted through the torque-transmitting system in a start-up phase. The desires of the driver for more or less acceleration are detected by the engine-load lever sensor 31 based on the position of the accelerator pedal and are subsequently put into effect by the control unit. The gas pedal position and the sensor signals are used as input quantities for controlling the start-up process of the vehicle.

During a start-up phase, the amount of torque to be transmitted, i.e., the target amount for the clutch torque $M_{Ctarget}$, is essentially determined by means of a predetermined function or from characteristic curves or curve fields which are, for example, dependent on the engine rpm-rate.

In a start-up phase, substantially from stand-still or from a crawl state, if the load lever or gas pedal is depressed by a certain amount a while the vehicle is moving at a slow speed, the motor control unit 40 will direct the engine to produce a certain amount of torque. The control unit of the automated clutch actuator 13 in a corresponding manner controls the amount of torque to be transmitted by the clutch in accordance with preset functions or data arrays, so that a stationary state of equilibrium sets in between the engine torque and the clutch torque. The state of equilibrium is characterized dependent on the load lever position a by a defined start-up rpm-rate, a start-up engine torque as well as a defined amount of transmittable torque of the torque-transmitting system and a defined amount of torque transmitted to the driving wheels. The representation of the start-up torque as a function of the start-up rpm-rate will be referred to as start-up characteristic in the following discussion. The load lever displacement a is of a proportionate amount as the displacement of the throttle valve of the engine.

In addition to the gas pedal 122 or other engine load controlling lever with an associated sensor 123, FIG. 2 shows a brake-actuating element 120 for actuating the main brake or the parking brake, such as a brake pedal, a hand-brake lever or a hand- or foot-actuated operator element of the parking brake. At least one sensor 121 is arranged at the actuator element 120 to monitor the degree of actuation of the latter. The sensor 121 is configured, e.g., as a binary sensor such as a switch, detecting whether the actuator element is on or off. This sensor can be in signal communication with an indicator device such as a brake light, which signals whether or not the brake is being applied. This concept may be used for the main brake as well as the parking brake. However, the sensor can also be configured as an analog sensor, e.g., in the form of a potentiometer, to determine the degree of activation of the actuator element. This sensor, too, can be in signal communication with an indicator device.

Figure 3A:
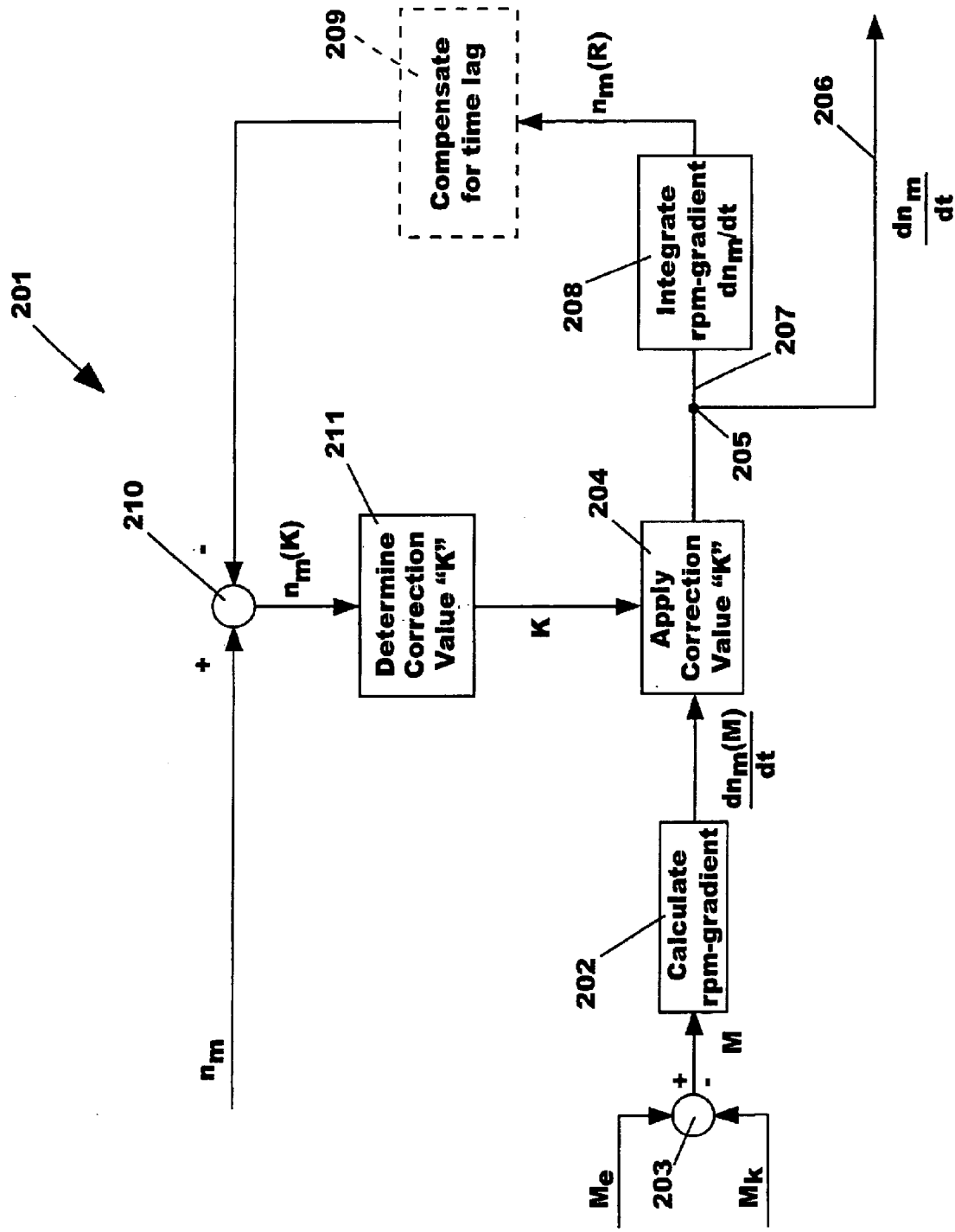
FIGS. 3a and 3b represent block diagrams of an observer.

FIG. 3a represents a block diagram to illustrate how a time gradient (rate of change) $dn_m/dt$ of the engine rpm-rate is determined by means of an observer 201 on the basis of an engine rpm-rate $n_m$ and a torque variable M during a slipping phase of a friction clutch. The torque variable M is calculated in a comparator unit 203 as the difference between a torque signal $M_e$ and a torque target $M_k$, where $M_e$ represents a torque quantity provided by the engine control device, for example by way of a CAN bus, which can be determined from a characteristic data array of the engine and other parameters such as, e.g., the position of the throttle valve. The torque $M_e$ represents the amount of engine torque that is currently being delivered by the engine at the given rpm-rate $n_m$. $M_k$ represents the targeted amount of torque to be transmitted through the clutch during a slipping phase. The value of $M_k$ can be determined in the clutch control device based on input quantities such as, e.g., the currently engaged gear, the transmission input rpm-rate, the transmission output rpm-rate, a driver input indicating an intention to shift gears, and other factors. In a subsequent block 202, the rpm gradient $dn_m(M)/dt$ which can be attributed to the torque quantity M is calculated as a quotient of a torque and an effective mass moment of inertia of the engine, using the appropriate conversion factor between an angular acceleration and an rpm-gradient. In the next following step 204, a correction value K is applied to the result of step 202 to obtain the rpm-gradient $dn_m/dt$ as a result. At the branch point 205, the rpm-gradient $dn_m/dt$ continues along two separate branches, i.e., an output branch 206 and a recursion-loop branch 207, where both branches use the value of the rpm-gradient $dn_m/dt$. In the recursion-loop branch 207, the rpm-gradient is integrated to obtain a recursive value $n_m(R)$ which in a further block 209 can be subjected to a compensation of the time lag that may exist between the times when the engine rpm-rate $n_m$ is measured and when the rpm-signal is transmitted, so that a time offset between the engine rpm-rate $n_m$ and the recursive value $n_m(R)$ can be prevented or minimized. Analogous to the block 209, it is understood that one could also insert a compensating block ahead of the comparator node 203 to perform an analogous compensation of the torque signal $M_e$ that is, either as an alternative or in addition to the compensation in block 209. In the comparator node 210, the difference between the engine rpm-signal $n_m$ and the recursive value $n_m(R)$ is determined and transmitted as an rpm-rate correction $n_m(K)$ to block 211, from which a correction value K is sent to the comparator node 204. At 204, the correction value K is added to the rpm-gradient $dn_m(M)/dt$ to form the rpm-gradient $dn_m/dt$.

Figure 3B:
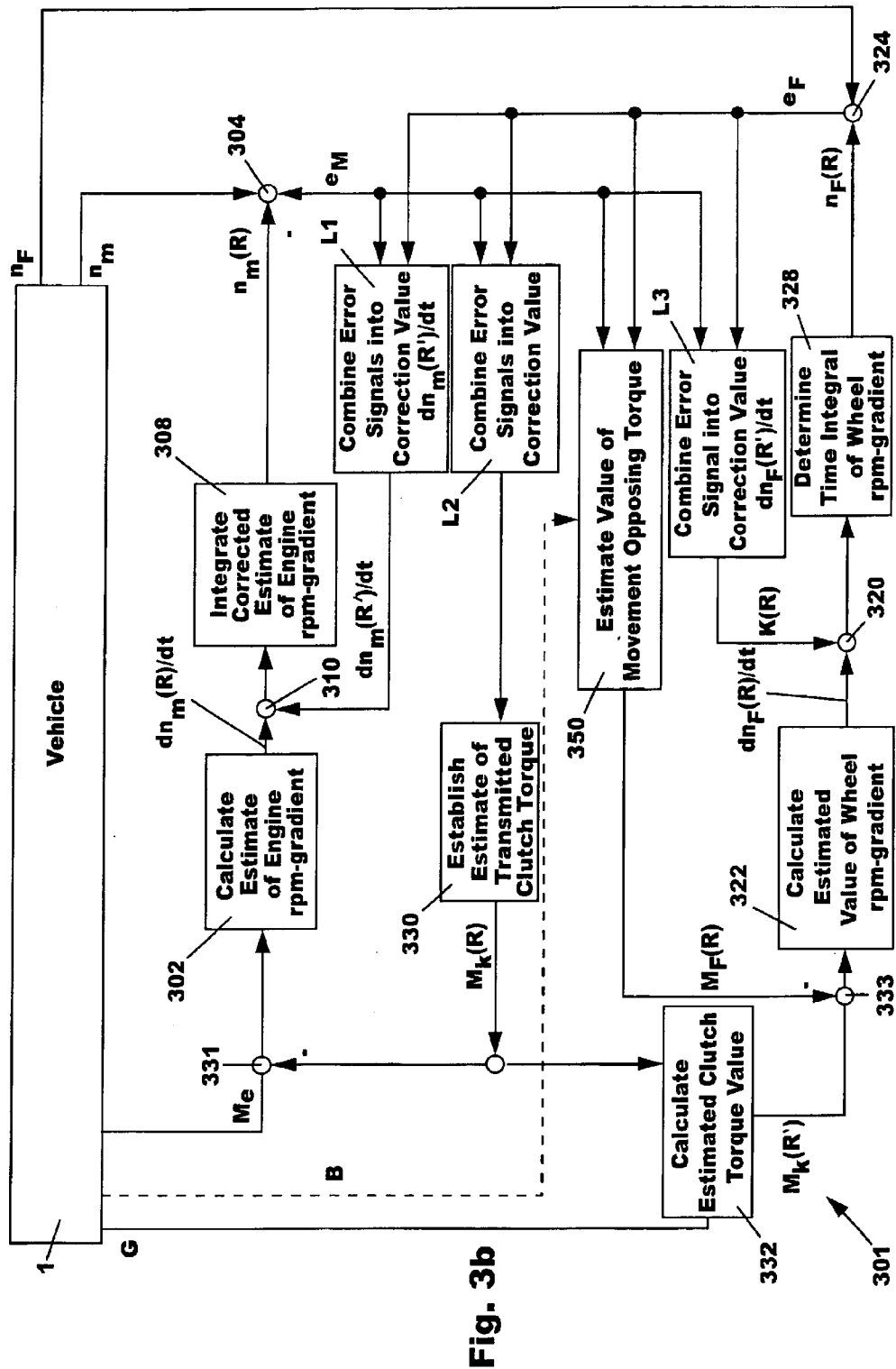

In comparison to the power train observer 201 of FIG. 3a, the power train observer 301 shown in FIG. 3b has several possible additions and variations. The signals that are useful or necessary for controlling a power train of a vehicle 1 (see FIG. 1), for example with at least one automated clutch and a gear-shifting transmission, can be generated or corrected under a uniform concept. In the example of the embodiment of a power train observer illustrated in FIG. 3b, the effective engine torque $M_e$, the transmitted clutch torque $M_k$, the overall torque $M_F$ opposing the movement of the vehicle, the mass moment of inertia $J_M$ of the engine, the mass of the vehicle represented as an equivalent mass moment of inertia $J_F$, the engine rpm-rate $n_m$, the wheel rpm-rate $n_F$ from which the travel velocity could be calculated, or the travel velocity of the vehicle as well as the overall ratio i of the transmission which depends on which gear is engaged.

Based on a mathematical model for this embodiment, the engine rpm-gradient $dn_m/dt$ and the vehicle rpm-gradient $dn_F/dt$ (for example based on the wheel rpm-rate or the rpm-rate of a rotating shaft in the transmission that is correlated to the wheel rpm-rate through a ratio factor) conform to the following equations:

$$\frac{dn_m}{dt} = \frac{30}{\pi} \cdot \frac{1}{J_M}(M_e - M_k) \quad (1)$$

$$\frac{dn_F}{dt} = \frac{30}{\pi} \cdot \frac{1}{J_F}(i\,(gear)\,M_k - M_F) \quad (2)$$

The transmitted clutch torque $M_k$ and the movement-resisting torque $M_F$ are essential quantities for the control of automated shift transmissions as well as automated clutches but are as a rule not measurable. These quantities are determined by means of the power train observer 301 shown in FIG. 3b.

The quantities that are supplied as inputs to the observer in the illustrated embodiment are the engine rpm-rate, the wheel rpm-rate $n_F$, the effective engine torque $M_e$ as well as a signal G that indicates which gear is currently engaged. The power train observer 301 is functioning preferably as a PI-observer, i.e., using proportional and integrating transfer components, in the form of a so-called perturbation observer. The basic idea behind this approach is to treat the transmitted clutch torque $M_k$ and the movement-opposing torque $M_F$ as unknown "perturbations".

Based on the engine torque $M_e$ that is given as a control target and the most recent estimated values for $M_k$ and $M_F$, the equations (1) and (2) are continuously recalculated in the observer, wherein stored values can be used for the unknown quantities. Several different initialization measures are proposed to provide plausible starting values for the estimated quantities $M_k(R)$, $M_F(R)$ and $n_m(R)$ at the time when the control device is switched on. In principle, the estimates could be initialized with start values of zero, if the relatively long convergence phase until the observer has reached a sufficient approximation are of no concern. Preferably, the following values can be used for the initialization:

$n_m(R)=n_m$ and $n_F(R)=n_F$

The estimate of $M_k(R)$ can advantageously be initialized as follows:

by using the current engine torque $M_e$ as the starting value for $M_k(R)$;

if the clutch is in a slipping condition, by using the current clutch position as a basis for estimating a starting value for $M_k(R)$;

by using the estimated value for $M_k(R)$ that was last stored (e.g., in an EEPROM) in the previous operating phase.

The estimate of $M_F(R)$ can advantageously be initialized:

by estimating the starting value based on the current wheel rpm-rate;

by starting with the estimated value for $M_F(R)$ that was last stored (e.g., in an EEPROM) in the previous operating phase.

After the initialization, the program runs in a cycle that can be based on a given clock frequency. In the node 331, the torque difference that accelerates the engine is calculated in each cycle from the effective engine torque $M_e$ and the estimated value $M_k(R)$. The result is passed on to block 302, where an estimate of the engine rpm-gradient $dn_m(R)/dt$ is calculated by taking the effective mass moment of inertia of the engine into account. At the node 310, the estimate for the engine rpm-gradient $dn_m(R)/dt$ is corrected with a correction value $dn_m(R')/dt$. The result from node 310 is integrated in block 308. The result of the integration represents an estimated engine rpm-rate $n_m(R)$, which is compared to the measured engine rpm-rate $n_m$ in the program node 304 to determine an error signal $e_M$.

In block 322, an estimated value of the wheel rpm-gradient $dn_F(R)/dt$ is calculated from the estimated quantities $M_k(R')$ and $M_F(R)$, after they have been tied together in the node 333. The estimated value $M_k(R')$ represents the clutch torque after it has been converted in the transmission, i.e., $M_k(R')$ is calculated in block 332 based on the estimated clutch torque $M_k(R)$ and the parameter G that identifies the currently engaged gear. The estimated torque value $M_F(R)$ represents the resistance that opposes the movement of the vehicle. The wheel rpm-gradient $dn_F(R)/dt$ is corrected in node 320 with the correction quantity K(R) and passed on to the box 328 where the wheel rpm-rate $n_F(R)$ is determined as the time integral and passed on to node 324 for comparison with a wheel rpm-rate $n_F$ that has been measured or determined by another method. The result of the comparison is an error signal $e_F$.

The error signals $e_M$, $e_F$ are used to continuously update and correct the estimated values of the observer. In the illustrated embodiment of FIG. 3b, this function is performed by four corrector blocks L1, L2, 350, and L3, each of which has an input for $e_M$ and an input for $e_F$. Each corrector block amplifies and applies weights to the error signals in relation to each other. Block L1 combines the error signals into a correction value $dn_m(R')/dt$ that is fed back directly to the node 310, and Block L3 combines the error signals into a correction value $dn_F(R')/dt$ that is fed back directly to the node 320. This serves to stabilize the observer overall, in order to prevent oscillations of the control loop. The output quantity from block L2 is integrated in block 330 to establish an estimate $M_k(R)$ of the transmitted clutch torque. Preferably, the values of the parameters used in the blocks L1, L2, L3 are selectable based on certain operating conditions, e.g., the currently engaged gear, the actuation of the gas pedal or brake pedal, the travel speed, and similar factors.

The corrector block 350 generates an estimated value $M_F(R)$ of the movement-opposing torque, which is corrected with the error signals $e_M$, $e_F$. The movement-opposing torque may, e.g., account for air resistance, grade angle of the road, and braking torques.

In a further preferred embodiment of a power train observer according to FIG. 3*b* the movement-opposing torque $M_F(R)$ is split up into different components:

$$M_F = M_{nom} + M_{slope} + M_{brake}.$$

The portion $M_{nom}$, as a rule, is known for a given vehicle. It represents the nominal travel resistance on a plane surface in the absence of a headwind or tailwind. To handle this nominal operating state, a transmission control system typically has a first array of characteristic shift data for the selection of the appropriate gear. However, a control characteristic designed for traveling on a level pavement is not suitable for uphill or downhill travel. It is therefore recommended to use an overall travel-opposing torque $M_F$ that also includes the deviation from the nominal torque. According to the foregoing equation, the deviation from the nominal torque is represented by the sum of the braking torque $M_{brake}$ and the torque $M_{slope}$ caused by the gravity component in the direction of the slope angle. As a matter of principle, the components $M_{brake}$ and $M_{slope}$ cannot be observed independently of each other without additional sensors. In some vehicle types, the torque $M_{brake}$ could be estimated from the sensor signal of existing brake pressure sensors, but the majority of current vehicles are equipped only with a brake light switch providing a signal B that is processed in the corrector block 350. In this case, the following procedure can be used:

When the brake is not actuated, the brake torque is assumed to be zero. At the same time, the error signal $e_F$ is used to continuously update the estimated value $M_{slope}(R)$ in the corrector block 350 in an analogous manner as the overall travel-opposing torque $M_F$ in the first embodiment of the power train observer illustrated in FIG. 3*b*.

When a signal is received that the brake is actuated, the value of $M_{slope}(R)$ is frozen at the value that was last observed prior to the actuation of the brake. The error information $e_F$ is now used to establish an estimated value $M_{brake}(R)$ of the brake torque. Thus, the value for $M_{slope}(R)$ remains available as a reference for selecting the appropriate gear for mountain travel or in other travel situations putting increased demands on the vehicle, where for example a lower gear needs to be selected to provide more tractive torque.

As an advantageous possibility, the observer 301 can be expanded to include the features that an engine torque offset for the idling condition of the engine is compensated and/or a constant deviation between the torque requested by the driver and the actually delivered torque is taken into account in the control system for the clutch or transmission. One can rely on the assumption that the engine torque signal $M_e$, as a rule, has a higher degree of relative accuracy than absolute accuracy and that even in a stationary operating state, i.e., in a phase when the engine torque is substantially constant, there is often a significant difference between the amount of torque requested by the driver and the amount of torque that is actually delivered. For example when traveling in a mountainous terrain with large variations in altitude, the amount of torque actually delivered for a given amount of gas pedal depression varies in a wide range. If in this kind of travel situation the clutch is engaged in accordance with a fixed torque control characteristic, the resulting clutch engagement process can be uncomfortable to the vehicle occupants. The invention proposes a concept to deal with this problem by introducing a factor $k_M$ in a power train observer, for example in the power train observer of FIG. 3*b*, so that the currently achievable engine torque $M_{e,current}$ can be estimated from the amount of torque $M_{e,request}$ ordered by the driver:

$$M_{e,current} \approx M_{e,current}(R) = k_M \cdot M_{e,request}$$

The factor $k_M$ is adapted during substantially stationary operating phases by minimizing the difference between the estimated quantity $M_{e,current}(R)$ and the actually delivered engine torque $M_{e,current}$.

In an advantageous variation of the power train observer 301, a model of the clutch characteristic is established during the slipping phases of the clutch. By combining the power train observer of the foregoing description with the model-supported variation, it is possible to achieve advantages for the adaptation of the clutch characteristic as well as for the results of the power train observer. It should be noted in particular that this offers the possibility to adapt the contact point (i.e., the engagement threshold) of the clutch during normal driving, so that it becomes unnecessary to perform special engagement procedures during suitable driving situations. During slipping phases of the clutch, the absolute amounts of transmittable clutch torque and actually transmitted clutch torque are identical. The transmitted clutch torque can therefore also be determined from the clutch position $x_k$ whose current value is available from the clutch control program or the transmission control program, based on the function $$|M_k(R)| = f(x_k).$$

It is advantageous if the control program for the automated shift transmission performs adaptations of the contact point, the friction value and/or the form factors, in order to continuously adapt the clutch characteristic to the current conditions of the vehicle, in particular to optimally follow the non-negligible fluctuations of the function $f(x_k)$ which is also referred to as the clutch characteristic.

A power train observer, for example of the type described in the context of FIG. 3*b*, can be advantageously implemented as a software algorithm in the transmission control device or clutch control device 107 (see FIG. 2). Of course, the program structure of the power train observer is implemented as a sequence of steps taking place in discrete time intervals. Consequently, an integration is performed as a cumulative summation of signals that follow each other in discrete time intervals.

Figure 4A:
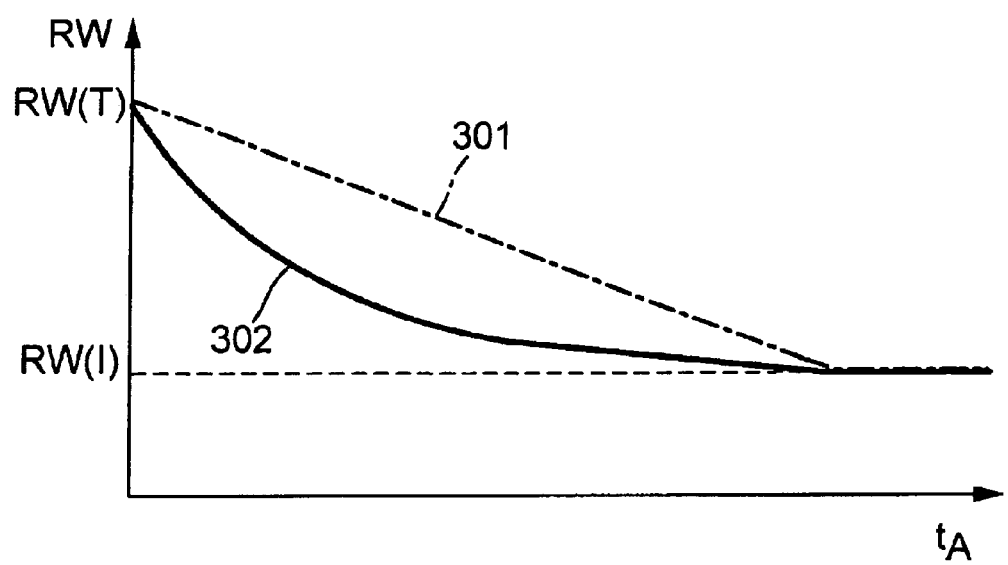
FIGS. 4a and 4b represent graphs of functional correlations.

The graph of FIG. 4*a* represents a friction value RW as a function of the amount of time $t_A$ that has elapsed since the engine or vehicle was switched off. In the time interval $t_A$, the clutch cools down so that the physical friction value of the clutch changes. Therefore, the friction value RW(T) that was adapted to a higher temperature level T needs to be adapted to the variable friction value of the clutch, reaching the value RW(I) if the clutch has cooled down to the ambient temperature level. The aforementioned algorithm can work with a linear decrease of the friction value as a function of $t_A$ as represented by the dash-dotted line 301, or it can decrease asymptotically to the end value RW(I), resembling a hyperbola in the shape of the curve 302. When the vehicle is started up again while the clutch is still warm, the appropriate friction value is used in accordance with the time $t_A$ that has elapsed since the vehicle or the engine was last switched off. Of course, the friction value RW as a function of the time span $t_A$ during which the vehicle was turned off could also be stored in the form of characteristic data arrays. The data arrays could be established on the basis of previous determinations of the clutch behavior, e.g., as a function of the ambient temperature, of the vehicle load, the presence or absence of a trailer, an operating profile containing such factors as gear shifts, acceleration and braking phases, traction of the wheels on the pavement, trip duration, grade angle of the road, and similar factors.

Figure 4B:
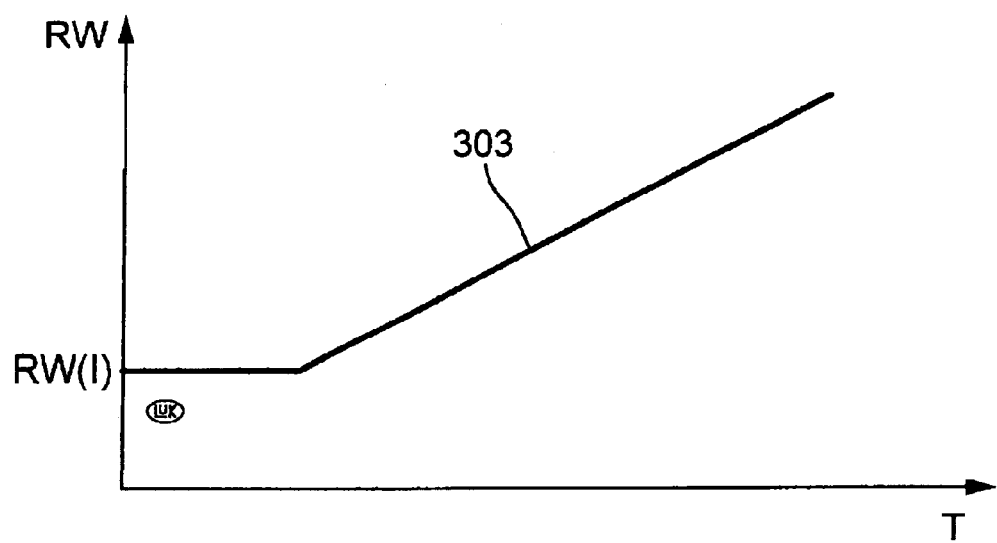

FIG. 4b illustrates another possibility of compensating the friction value RW determined by a clutch control device after the vehicle has been turned off and subsequently restarted with the clutch still warm. The determination of the friction value RW under this alternative concept does not rely on the elapsed time since the vehicle was turned off but uses instead a temperature-based model for determining the clutch temperature based on the engine temperature, for example through a measurement of the coolant temperature. If the engine temperature is close to the ambient temperature, the initial friction value RW(I) is used. If the engine temperature is above the ambient temperature, the clutch temperature T is derived from the engine temperature, and the friction value is determined as a function of T as represented by the curve 303 in FIG. 3b, which is shown as a linear function but could also have a different curve shape.

What is claimed is:

1. A method for controlling an automated clutch of a motor vehicle having an engine with a crankshaft and a transmission with a transmission input shaft and a transmission output shaft, wherein the automated clutch is arranged to transmit a clutch torque between the crankshaft and the transmission input shaft, and wherein during at least one operating phase of the vehicle, the automated clutch is controlled dependent on an engine rpm-gradient ($dn_m/dt$), the method comprising:
    a) determining a first engine rpm-gradient signal ($dn_m/dt$) based on an engine torque signal ($M_e$) and a target value ($M_k$) of the clutch torque;
    b) recursively determining an engine rpm-rate signal ($n_m(R)$) based on said engine rpm-gradient signal;
    c) comparing an actual engine rpm-rate ($n_m$) to said engine rpm-rate signal ($n_m(R)$) and determining a correction quantity K based on said comparison; and
    d) correcting said first engine rpm-gradient signal ($dn_m(M)/dt$) with said correction quantity.

2. The method of claim 1, wherein the first engine rpm-gradient signal ($dn_m(M)/dt$) is based on a torque difference between the engine torque signal ($M_e$) and the target value ($M_k$) of the clutch torque.

3. The method of claim 1, wherein the correction quantity K is based on a torque difference between the actual engine rpm-rate ($n_m$) and said engine rpm-rate signal ($n_m(R)$).

4. The method of claim 1, wherein the correction quantity K is assigned a predetermined weight in said correcting of the first engine rpm-gradient signal.

5. The method of claim 1, further comprising the step of compensating a time lag occurring between a time when a signal is generated and a time when said signal is used in the method.

6. The method of claim 5, wherein the signal comprises the engine torque signal ($M_e$).

7. The method of claim 5, wherein the signal comprises the engine rpm-rate signal ($n_m(R)$).

8. The method of claim 1, further comprising the step of compensating a time lag occurring between a time when the engine rpm-rate signal ($n_m(R)$) is generated and a time when the actual engine rpm-rate ($n_m$) is determined.

9. The method of claim 1, wherein the engine rpm-gradient ($dn_m/dt$) is used to determine a characteristic quantity of the clutch.

10. The method of claim 9, wherein said characteristic quantity of the clutch comprises a friction value (RW) approximating a physical friction value of the clutch.

11. The method of claim 1, further comprising the steps of determining and correcting a movement-opposing torque of the vehicle.

12. The method of claim 11, wherein the movement-opposing torque is corrected by means of correction values that are given as a characteristic curve in function of an air resistance.

13. The method of claim 11, wherein the movement-opposing torque is corrected dependent on a grade angle of a road being traveled by the vehicle.

14. The method of claim 11, wherein the movement-opposing torque is corrected by means of a correction signal, and wherein said correction signal is determined based on at least one error between an estimated value and an actual value of at least one quantity.

15. The method of claim 14, wherein the at least one quantity comprises an engine rpm-rate ($n_m$), wherein the estimated value is based on an effective engine torque, and wherein the at least one error comprises a first error based on a comparison between the estimated value and the actual value of the engine rpm-rate ($n_m$).

16. The method of claim 15, wherein said first error is used to correct at least one estimated quantity.

17. The method of claim 14, wherein the at least one quantity comprises a traveling-speed related quantity, wherein the estimated quantity is based on an effective engine torque, and wherein the at least one error comprises a second error based on a comparison between the estimated value and the actual value of the traveling-speed related quantity.

18. The method of claim 17, wherein the traveling-speed related quantity comprises a wheel rpm-rate.

19. The method of claim 17, wherein the effective engine torque is corrected with an estimated value for a transmitted clutch torque.

20. The method of claim 17, wherein said second error is used to correct at least one estimated quantity.

* * * * *